United States Patent Office 3,296,092
Patented Jan. 3, 1967

3,296,092
FERMENTATION PROCESS FOR PRODUCING DEXTROSE
Julian Corman, Muscatine, Iowa, assignor to Grain Processing Corporation, Muscatine, Iowa, a corporation of Iowa
No Drawing. Filed Oct. 5, 1964, Ser. No. 401,685
7 Claims. (Cl. 195—31)

This invention relates to the production of dextrose by the hydrolyzation of amylaceous materials with enzymes. More particularly, the invention relates to the enzymatic hydrolyzation of amylaceous materials to obtain improved yields of dextrose.

It is known that fungal enzymes are capable of converting starch to dextrose. Thus, for example, microorganisms derived from *Aspergillus niger, Aspergillus oryzae, Rhizopus delemar, Mucor rouxii, Aspergillus phoenicis* and *Aspergillus flavus* are useful for this purpose. Various terms have been used in the art to describe the enzyme which produces dextrose from starch. Thus, for example, this enzyme has been referred to as maltase, alpha-glucosidase, amylo-glucosidase, gluco-amylase and glucoamylase. In the present application the starch saccharifying enzyme is designated glucoamylase. One unit of glucoamylase is that amount of enzyme that can hydrolyze a soluble starch solution at 60° C. and pH. 4.3 so as to produce reducing power at a rate equivalent to one gram dextrose per hour providing that not more than 25 percent of the starch substrate is saccharified during the time of hydrolysis.

The broth resulting from the fermentation of these organisms generally contains several enzymes having different activities, some of which interfere with the production of dextrose when the enzyme preparation is employed to hydrolyze starch. Thus, for example, in the culture broth of *Aspergillus niger* three predominant enzyme systems have been identified, namely, alpha-amylase, glucoamylase (amyloglucosidase) and transglucosidase. Alpha-amylase attacks gelatinized starch by a random splitting of the starch molecule, thus causing a desirable reduction in the viscosity of the gelatinized starch dispersion. This dispersion contains a linear fraction from amylose of polymerized dextrose attached in the alpha-1,4-positions and a branched polymer from amylopectin which also contains alpha-1,4-linkages but in addition has branched positions adjoining with alpha-1,6-linkages.

In contrast to the multi-chain action of alpha-amylase, the action of glucoamylase is thought to be a "single chain" action where an enzyme molecule attaches to the dextrin and detaches one glucose unit at a time from the dextrose chain and thus theoretically converts starch quantitatively to dextrose. The action of glucoamylase on dextrin polymers is much more specific at the alpha-1,4-glucosidic bonds than the alpha-1,6-glucosidic bonds in that it will cleave the former type bond approximately 30 times as fast as the latter type bond.

The presence of transglucosidase with glucoamylase in enzyme preparations detracts from the potential yield of dextrose in the hydrolyzate. Transglucosidase is known to catalyze transglucosylation reactions between dextrose, maltose and other intermediate saccharified products. As a result, upon completion of the saccharification reaction saccharides other than dextrose are still present in substantial amounts. Accordingly, the yield of dextrose is not always as high as desired.

To improve the yield of dextrose it has been suggested to subject the enzyme preparation prior to hydrolyzation to purification procedures to remove transglucosidase and other enzymes which are believed to interfere with the production of dextrose. While several purification techniques are effective in this regard, they involve additional operations which significantly contribute to the cost of producing the dextrose. It is therefore an object of the present invention to provide a novel process of hydrolyzing starch with fungal enzymes to obtain high yields of dextrose without the necessity of first subjecting the fungal enzyme preparation to separate purification treatments.

According to prior art practices, the hydrolysis of starch with fungal enzymes to produce dextrose is generally carried out by first reducing the viscosity of the starch to within suitable limits. Thereafter enzymatic hydrolysis of the starchy material dispersed in water is generally carried out at a pH within a range from 3.5 to 6.5 and at a temperature of from 35 to 60° C. The starch hydrolysis is carried out for various lengths of time depending on several operating variables such as temperature, substrate concentration, ratio of glucoamylase to substrate, and so forth.

The prior art teaches that the enzymatic hydrolyzation should be carried out at a pH of from about 3.5 to 6.5 as indicated and that low pH values below about 3 are to be avoided due to inactivation of the glucoamylase enzyme. Thus, for example, U.S. Patent No. 2,967,804 which relates to a method of making dextrose using purified amyloglucosidase (glucoamylase) teaches that the optimum pH range for the hydrolyzation is about 4 to 6.5. Similarly, John Pazur and Tadahiko Ando in an article published in the Journal of Biological Chemistry, vol. 234, 1966–1970 (1959), discussed "The Action of an Amylo-glucosidase of *Aspergillus niger* on Starch and Malto-oligosaccharides." In this article the authors state, "A typical pH curve was obtained for the enzymes with maximal activity of pH 4.8 and with approximately 50 percent inactivation at pH values below 3.0 or above 6.5."

Contrary to the teachings of the art, it has now been found unexpectedly that the yield of dextrose can be significantly improved by carrying out, at least in the initial stage, the hydrolysis of starch with a glucoamylase-containing fungal enzyme preparation at a pH below 3. A pH value within the range of about 1.5 to 3 can be employed. When employing a pH value in the lower end of the range, that is a pH of about 1.5, the hydrolysis is carried out for only a relatively short period, such as 15 to 30 minutes, before adjusting the pH to a higher value for completion of the hydrolysis. Conduct of the hydrolysis at an extremely low pH for long periods is to be avoided and may result in marked reduction in the yield of dextrose. On the other hand, when employing a pH in the upper end of the range, such as a pH of 2.5, the entire hydrolysis can be carried out at this pH without substantial inactivaion of the glucoamylase enzyme.

According to one preferred embodiment of the present invention an amylaceous material is partially converted by some means to reduce its viscosity when dispersed in water. Any suitable starch or starch-derived substrate such as, for example, lower sugars can be used in the process. The pretreatment or partial hydrolysis of the starch material can be accomplished by acid hydrolysis or enzymatic hydrolysis with purified alpha-amylase to obtain a substrate having a solids concentration of from about 20 to 45 percent with about 10 to 25 dextrose equivalent (D.E.).

The starch-derived substrate, preferably after pretreatment as indicated, is dispersed in water and hydrolysis carried out with a glucoamylase-containing fungal enzyme preparation. This hydrolysis is carried out at a temperature in the range from about 35 to 60° C. or higher, preferably 50° to 60° C. During the initial stage of the hydrolysis, say for the first 15 minutes, the pH is maintained at about 1.5.

Any suitable acid such as hydrochloric acid, sulfuric acid, phosphoric acid, acetic acid and the like can be used to adjust the pH to the desired level. After initiation of the hydrolysis of the starchy substrate at a pH of 1.5 for 15 minutes, the pH of the substrate is adjusted to within the range of 3.5 to 6.5, preferably pH 4, and the hydrolysis of the starch is carried to completion. Generally, the hydrolysis of the starch or starch product is carried out for periods ranging from about 36 to 72 hours or more to produce hydrolyzates having desirably high dextrose contents.

The following examples further illustrate the process of the invention and the advantages thereof.

*Example I*

The enzymes from a culture filtrate of *Aspergillus niger* that had been precipitated with methanol were redissolved in water and used at a level of one glucoamylase unit per six grams of starch to saccharify 100 gram aliquots of liquefied starch dextrin made from a 30% starch paste and adjusted to pH 4.0, 3.5 and 2.5. The saccharification mixtures contained in 250 milliliter Erlenmeyer flasks were placed on a reciprocal shaker and incubated at 60° C. for 72 hours. After this time the reducing powers were determined by the method of Somogyi described in the Journal of Biological Chemistry, 160, 61–68 (1945). The results calculated on a dry basis as percent dextrose and termed dextrose equivalent (D.E.) were as follows:

Saccharification pH:             D.E. at 72 hours
4.0 _____ 92.9
3.5 _____ 93.3
2.5 _____ 94.4

*Example II*

The saccharification treatments at pH 4.0 and 2.5 described in Example I were repeated except that after 24 hours the pH of the hydrolyzates were reversed; that is 1 N HCl was added to the initial pH 4.0 hydrolyzate so that saccharification was continued at pH 2.5 while 1 N NaOH was added to the initial pH 2.5 hydrolyzate at 24 hours and saccharification continued at pH 4.0. After 72 hours agitation at 60° C. the following dextrose equivalent values were obtained.

| Saccharification pH | | D.E. at 72 hours |
|---|---|---|
| Initial pH | pH adjusted at 24 hours | |
| 4.0 | 2.5 | 91.1 |
| 2.5 | 4.0 | 95.9 |

The above results illustrate that to obtain improved yields of dextrose, the initial stage of the hydrolysis should be carried out at a low pH. Use of a low pH, that is a pH below 3 during a later stage of the hydrolysis does not improve the yield of dextrose.

*Example III*

The saccharification procedure as described in Example I was repeated using a continuous saccharification pH of 4.0 as the control. Three additional saccharification mixtures were adjusted initially to pH 2.5 and then readjusted respectively after 12, 18 and 24 hours to pH 4.0. Saccharification was continued at 60° C. for 84 hours when the following dextrose equivalent (D.E.) values were obtained:

Saccharification pH changed
from 2.5 to 4.0 at—             D.E. at 84 hours
12 hours _____ 96.0
18 hours _____ 95.9
24 hours _____ 95.5
pH 4.0 for 84 hours _____ 92.4

The above data clearly show the increased dextrose production in starch hydrolyzates when saccharification is started at pH below 3 and then subsequently readjusted to a higher pH value.

*Example IV*

The saccharification procedure described in Example I was repeated but this time the pH values of the saccharification mixtures were adjusted to pH 4.0, 3.0, 2.9, 2.8, 2.7 and 2.6 and maintained at these respective pH values throughout the entire hydrolysis. After 96 hours incubation at 60° C. the dextrose equivalents (D.E.) values were as follows:

Saccharification pH:             D.E. at 96 hours
4.0 _____ 93.4
3.0 _____ 94.3
2.9 _____ 95.7
2.8 _____ 96.3
2.7 _____ 95.1
2.6 _____ 95.7

*Example V*

The saccharification procedure described in Example I was repeated but the initial pH of the starch dextrin-enzyme mixture in one flask was adjusted to pH 1.5 and incubated at 60° C. for 30 minutes when the pH was readjusted to 4.0 Two other starch saccharification mixtures were adjusted to an initial pH 2.0 and incubated at 60° C. After 1 and 2 hours respectively, the pH was adjusted to 4.0 for the remainder of the hydrolysis time. A fourth saccharification mixture as a control was adjusted to pH 4.0 and maintained at this pH throughout the saccharification for comparison. After 72 hours the dextrose equivalent (D.E.) values were as follows:

| Initial saccharification pH | Time of adjustment to pH 4.0 | D.E. at 72 hours |
|---|---|---|
| 1.5 | 30 minutes | 93.9 |
| 2.0 | 1 hour | 96.5 |
| 2.0 | 2 hours | 96.8 |
| 4.0 | | 93.8 |

*Example VI*

The saccharification procedure described in Example I was repeated but the initial pH of the starch dextrin-enzyme mixture in one flask was adjusted to pH 4.0 for a control and the rest were adjusted to pH 2.5. All flasks were incubated at 60° C. and at various times the pH of the solutions were adjusted to pH 4.0. The incubation at 60° C. was continued for 96 hours. At that time the following dextrose equivalent (D.E.) values were obtained:

| Initial pH | Time of adjustment to pH 4.0, hours | D.E. at 96 hours |
|---|---|---|
| 2.5 | 2 | 97.3 |
| 2.5 | 4 | 97.4 |
| 2.5 | 5 | 96.8 |
| 2.5 | 6 | 96.9 |
| 2.5 | 8 | 96.3 |
| 2.5 | 12 | 96.8 |
| 4.0 | | 94.0 |

The improvement obtained by the initial adjustment to pH 2.5 followed by readjustment to pH 4.0 after 2 to 12 hours is obvious.

*Example VII*

Two 100 gallon capacity tanks equipped with agitators and means for temperature control were filled with 70 gallons of 15° Bé. (27.81% solids) starch slurry. The starch in both tanks was liquefied with bacterial α-amylase. The temperature then was adjusted to 140° F. and the pH was adjusted to 4.0 in one tank and to 2.5 in the other. To both tanks was added a glucoamylase preparation that had been prepared by solvent precipitating and drying a concentrate of an *Aspergillus niger* culture filtrate. The enzyme was added at the rate of 80 glucoamylase units per pound of dry starch. After 4 hours saccharification time the starch batch having the initial pH of 2.5 was treated with an alkaline material to readjust the pH to 4.0. The saccharification was continued for a total of 72 hours at which time the batch started at pH 4.0 had a dextrose equivalent (D.E.) value of 93.8 whereas the batch started at pH 2.5 with subsequent adjustment to pH 4.0 had a dextrose equivalent (D.E.) value of 98.1.

*Example VIII*

The advantages of the invention can be realized by hydrolyzing a part of the starch derived substrate at a pH below about 3 and then subsequently incorporating therewith the remainder of the starch to be hydrolyzed.

The data presented in the following table show that a high dextrose content is achieved when 5, 10 and 20% of the starch substrate is hydrolyzed at a low pH before addition of the remainder of the starch substrate.

Five glucoamylase units of a methanol precipitated glucoamylase enzyme preparation were added to several flasks and the indicated amounts of a 30% dextrin preparation added. The flasks were incubated at 60° C. for 4 hours at the indicated pH after which dextrin was added as indicated, the pH adjusted to 4.2 and incubation continued to 88 hours. Dextrose equivalent (D.E.) determinations were made at 64 and 88 hours as shown.

| Enzyme | Initial dextrin, grams | Initial pH | Dextrin added at 4 hours, grams | D.E. at— | |
|---|---|---|---|---|---|
| | | | | 64 hr. | 88 hr. |
| Reconstituted MeOH precipitated | 100 | 4.2 | 0 | 93.8 | 94.7 |
| | 0 | 2.4 | 100 | 38.5 | 41.1 |
| | 5 | 2.4 | 95 | 95.1 | 96.7 |
| | 10 | 2.4 | 90 | 95.9 | 97.9 |
| | 20 | 2.4 | 80 | 98.9 | 98.6 |
| | 100 | 2.4 | 0 | 97.1 | 98.6 |

Those modifications and equivalents which fall within the spirit of the invention and the scope of the appended claims are to be considered part of the invention.

I claim:

1. In a process for producing dextrose from starchy materials wherein a starch derived substrate is hydrolyzed with an unpurified glucoamylase and transglucosidase-containing fungal enzyme preparation, the improvement which consists in carrying out at least the initial stage of the hydrolysis with the said enzyme preparation at a pH below 3.

2. In a process for producing dextrose from starchy materials wherein a starch derived substrate is hydrolyzed with an unpurified glucoamylase and transglucosidase-containing fungal enzyme preparation, the improvement which consists in carrying out at least the initial stage of the hydrolysis with the said enzyme preparation at a pH within the range from about 1.5 to below 3.

3. In a process for producing dextrose from starchy materials wherein a starch derived substrate is hydrolyzed with an unpurified glucoamylase and transglucosidase-containing fungal enzyme preparation, the improvement which consists in carrying out the hydrolysis to substantial completion and employing at least in the initial stage of the hydrolysis the said enzyme preparation at a pH below 3.

4. A process for producing dextrose from starchy materials which comprises hydrolyzing a starch derived substrate with in unpurified glucoamylase and transglucosidase-containing fungal enzyme preparation at a temperature within the range from about 35 to about 60° C. and at a pH below 3 at least during the initial stage of the hydrolysis with the said enzyme preparation.

5. A process for producing dextrose from starchy materials which comprises hydrolyzing a starch derived substrate with an unpurified glucoamylase and transglucosidase-containing fungal enzyme preparation at a temperature within the range from about 35 to about 60° C. and at a pH within the range from about 1.5 to below 3 at least during the initial stage of the hydrolysis with the said enzyme preparation.

6. A process for producing dextrose from starchy materials which comprises hydrolyzing a starch derived substrate with an unpurified glucoamylase and transglucosidase-containing fungal enzyme preparation at a pH of about 1.5 for a period not in excess of about 30 minutes, then adjusting the pH of the substrate undergoing hydrolysis to within the range from about 3.5 to 6.5 and then substantially completing the hydrolysis.

7. A process for producing dextrose from starchy materials which comprises hydrolyzing substantially completely an unpurified starch derived substrate with a glucoamylase and transglucosidase-containing fungal enzyme preparation at a pH of about 2.5.

References Cited by the Examiner

UNITED STATES PATENTS

| | | | |
|---|---|---|---|
| 2,567,000 | 9/1951 | Wallerstein et al. | 195—31 |
| 3,039,935 | 6/1962 | Rentshler et al. | 195—31 |
| 3,047,471 | 7/1962 | Hurst et al. | 195—31 |

OTHER REFERENCES

Pazur et al., Journal of Biological Chemistry, vol. 234 No. 8, pages 1966–1970, August 1959.

A. LOUIS MONACELL, *Primary Examiner.*

ALVIN E. TANENHOLTZ, *Examiner.*